United States Patent
Kong

(10) Patent No.: US 9,454,381 B2
(45) Date of Patent: Sep. 27, 2016

(54) METHOD FOR CONTROLLING REGISTRATION OF INPUT DEVICE IN INPUT HANDLER INSTANCE, TERMINAL AND STORAGE DEVICE

(71) Applicants: Hisense Mobile Communications Technology Co., Ltd., Shandong (CN); Hisense USA Corporation, Suwanee, GA (US)

(72) Inventor: Zhiqiang Kong, Shandong (CN)

(73) Assignees: Hisense Mobile Communications Technology Co., Ltd. (CN); Hisense USA Corporation, Suwanee, GA (US)

( * ) Notice: Subject to any disclaimer, the term of this patent is extended or adjusted under 35 U.S.C. 154(b) by 286 days.

(21) Appl. No.: 14/142,985

(22) Filed: Dec. 30, 2013

(65) Prior Publication Data
US 2014/0189342 A1 Jul. 3, 2014

(30) Foreign Application Priority Data
Dec. 31, 2012 (CN) .......................... 2012 1 0594390

(51) Int. Cl.
G06F 9/445 (2006.01)
G06F 9/44 (2006.01)

(52) U.S. Cl.
CPC .................................. *G06F 9/4411* (2013.01)

(58) Field of Classification Search
None
See application file for complete search history.

(56) References Cited

U.S. PATENT DOCUMENTS 5,974,474 A * 10/1999 Furner ................... G06F 13/10
710/10
2005/0246561 A1* 11/2005 Wu ........................ G06F 1/3203
713/300

* cited by examiner

*Primary Examiner* — Idriss N Alrobaye
*Assistant Examiner* — Dayton Lewis-Taylor
(74) *Attorney, Agent, or Firm* — DLA Piper LLP (US)

(57) ABSTRACT

A method for controlling an input device to be registered with an input handler instance includes: an input handler instance corresponding to a CPU frequency adjusting mode obtains device driver information of an input device upon detection of the input device; determines whether the device driver information is the same as one of sets of registration match information stored in the input handler instance; if so, then sends successful registration information to an input device instance corresponding to the input device to allow an input event to be reported; if the device drive information of the input device is not the same as any of the sets of registration match information, then sends failure registration information to the input device instance to disallow an input event to be reported; and the input device instance stores an identifier of the input handler instance upon reception of the successful registration information.

18 Claims, 3 Drawing Sheets

METHOD FOR CONTROLLING REGISTRATION OF INPUT DEVICE IN INPUT HANDLER INSTANCE, TERMINAL AND STORAGE DEVICE

The present application claims priority to Chinese Patent Application No. 201210594390.0, filed with the Chinese Patent Office on Dec. 31, 2012 and entitled "method and apparatus for controlling registration of input device in input handler instance", which is hereby incorporated by reference in its entirety.

FIELD OF THE INVENTION

The present invention relates to the field of smart terminals and particularly to a method for controlling an input device to be registered with an input handler instance, terminal and storage device.

BACKGROUND OF THE INVENTION

A smart mobile phone consumes significant power, and a kernel in the existing smart mobile phone is provided with a mechanism to adjusting the frequency of a Central Processing Unit (CPU) for lower power consumption.

Specifically, the adjusting mechanism is performed during startup in a "Performance" mode in which the CPU operates at the highest level frequency to improve a startup response speed and ensure optimal performance. When the smart mobile phone is enabled fully, the adjusting mechanism is performed in an "On Demand" mode in which if there is an input event, then the frequency of the CPU is adjusted by an input handler instance, and if there is no input event, the frequency of the CPU is adjusted according to a load of the CPU.

In the On Demand mode, all of input devices will be registered with an input handler instance. Each time there is an input device reporting an input event to an input handler, the kernel will adjust the frequency of the CPU to the highest level. If there is no input event, then the frequency of the CPU will be lowered gradually according to a load condition of the CPU.

When the smart mobile phone is in an operating mode, an input device will report an input event frequently, and the frequency of the CPU will be adjusted to the highest level each time an input event is reported. Thus in the On Demand mode, the CPU may operate at a high frequency for a long period of time, thus resulting in remaining high power consumption of the smart mobile phone.

SUMMARY OF THE INVENTION

An object of the invention is to provide a method for controlling an input device to be registered with an input handler instance, terminal and storage device so as to address the problem of high power consumption of a smart terminal as a result of a CPU of the smart terminal operating at a high frequency for a long period of time.

The object of the invention is achieved in the following technical solutions.

A method for controlling an input device to be registered with an input handler instance, including:

obtaining, by an input handler instance corresponding to a central processing unit frequency adjusting mode, device driver information of an input device upon detection of the input device;

determining, by the input handler instance, whether the device driver information of the input device is the same as one of sets of registration match information stored in the input handler instance;

if so, then sending, by the input handler instance, successful registration information to an input device instance corresponding to the input device to allow an input event to be reported;

if the device drive information of the input device is not the same as any of the sets of registration match information stored in the input handler instance, then sending, by the input handler instance, failure registration information to the input device instance corresponding to the input device to disallow an input event to be reported; and storing, by the input device instance corresponding to the input device, an identifier of the input handler instance upon reception of the successful registration information.

A terminal, including: a processor, configured to implement:

a device driver information obtaining module configured to obtain device driver information of an input device upon detection of the input device;

a condition matching module configured to determine whether the device driver information of the input device is the same as one of sets of registration match information stored in an input handler instance corresponding to a central processing unit frequency adjusting mode;

a registration control module configured to send successful registration information to an input device instance corresponding to the input device to allow an input event to be reported in the case that the condition matching module determines that the device driver information of the input device is the same as one of the sets of registration match information stored in the input handler instance; and to send failure registration information to the input device instance corresponding to the input device to disallow an input event to be reported in the case that the condition matching module determines that the device driver information of the input device is not the same as any of the sets of registration match information stored in the input handler instance; and an input device driver module configured to store an identifier of the input handler instance upon reception of the successful registration information.

A storage device that stores program code for controlling an input device to be registered with an input handler instance, wherein the program code is executable by a processor to implement:

a device driver information obtaining module configured to obtain device driver information of an input device upon detection of the input device;

a condition matching module configured to determine whether the device driver information of the input device is the same as one of sets of registration match information stored in an input handler instance corresponding to a central processing unit frequency adjusting mode;

a registration control module configured to send successful registration information to an input device instance corresponding to the input device to allow an input event to be reported in the case that the condition matching module determines that the device driver information of the input device is the same as one of the sets of registration match information stored in the input handler instance; and to send failure registration information to the input device instance corresponding to the input device to disallow an input event to be reported in the case that the condition matching module determines that the device driver information of the input device is not the same as any of the sets of registration match information stored in the input handler instance; and an input device driver module configured to store an identifier of the input handler instance upon reception of the successful registration information.

In the prior art, all of input devices are registered with an input handler instance, so all the input devices will report an input event to the input handler instance. With the method, terminal and storage device according to the embodiments of the invention, an input device is controlled to be registered with an input handler instance, where only the input device with the same device driver information as registration match information stored in the input handler instance is allowed to be registered with the input handler instance. An input event will only be reported from the input device registered with the input handler instance, and the frequency of a CPU of a smart terminal will be adjusted to the highest level in response to the input event, so that the CPU will be prevented from operating at a high frequency for a long period of time to thereby lower power consumption of the smart terminal.

DETAILED DESCRIPTION OF THE EMBODIMENTS

An embodiment of the invention provides a method for controlling an input device to be registered with an input handler instance. In a smart terminal to which the method is applied, an input device is controlled to be registered with an input handler instance, where only the input device with the same device driver information as registration match information stored in the input handler instance is allowed to be registered with the input handler instance. An input event will only be reported from the input device registered with the input handler instance, and the frequency of a CPU of the smart terminal will be adjusted to the highest level in response to the input event, so that the CPU will be prevented from operating at a high frequency for a long period of time to thereby lower power consumption of the smart terminal. In the embodiment of the invention, the input handler instance includes handling mechanism and content storage.

The smart terminal as referred to in the embodiment of the invention can be but will not be limited to a smart mobile phone, a palm computer, a palm game machine, etc.

The technical solution according to the embodiment of the invention will be described below in details with reference to the drawings.

Figure 1:
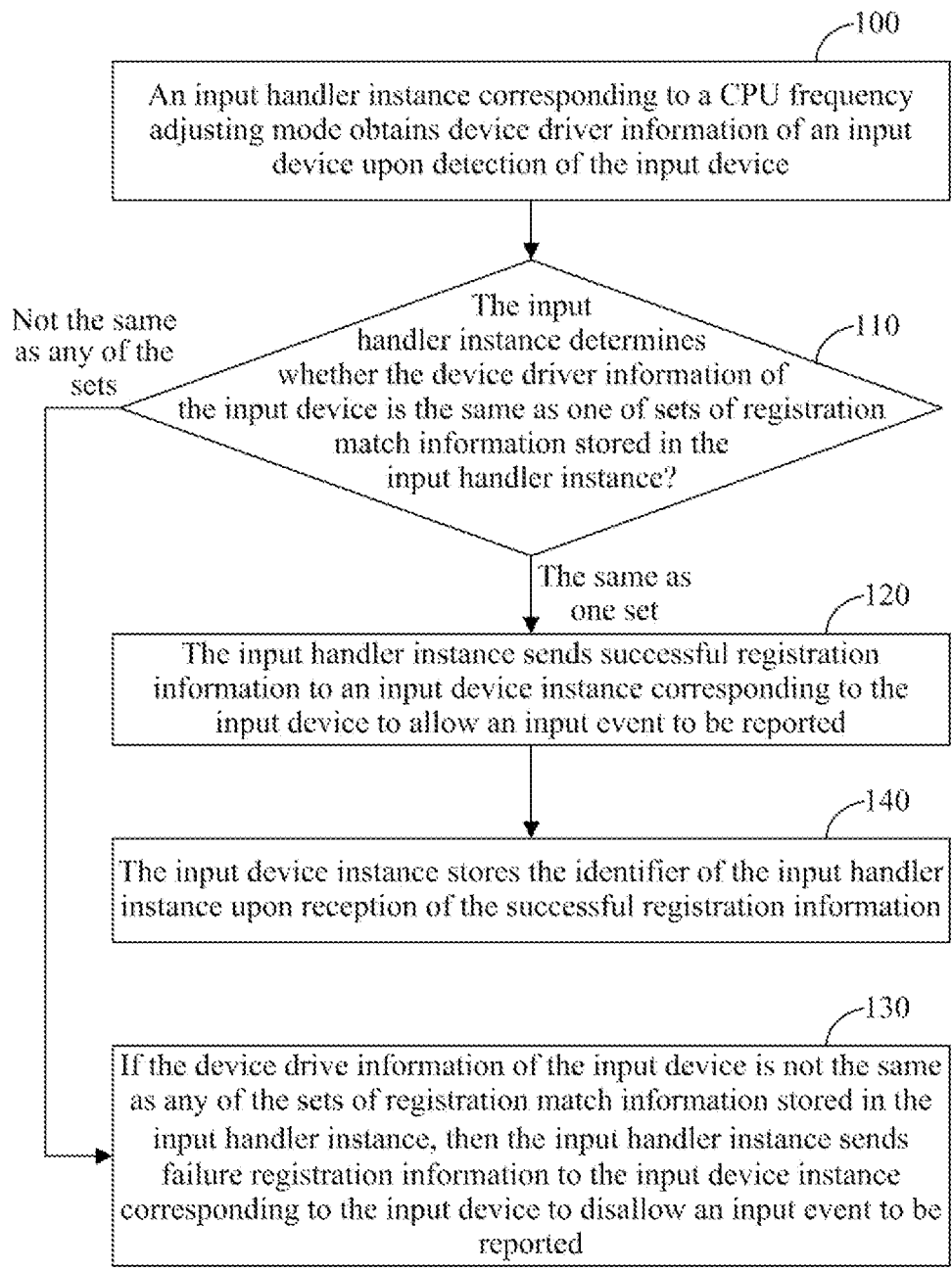
FIG. 1 is a flow chart of a first method for controlling an input device to be registered with an input handler instance according to an embodiment of the invention.

An implementation of a method for controlling an input device to be registered with an input handler instance according to an embodiment of the invention is illustrated in FIG. 1, the method includes the following steps.

Step 100. An input handler instance corresponding to a CPU frequency adjusting mode obtains device driver information of an input device upon detection of the input device.

In a particular implementation without limitation thereto, the input handler instance detects an input device instance of the input device, that is, detects the input device, and obtains the device driver information from the input device instance.

Each input device has a corresponding device data structure in the operating system, where the device data structure is an input device instance corresponding to the input device.

Step 110. The input handler instance determines whether the device driver information of the input device is the same as one of sets of registration match information stored in the input handler instance.

Step 120. If so, then the input handler instance sends successful registration information to the input device instance corresponding to the input device to allow an input event to be reported.

Step 130. If the device drive information of the input device is not the same as any of the sets of registration match information stored in the input handler instance, then the input handler instance sends failure registration information to the input device instance corresponding to the input device to disallow an input event to be reported.

Step 140. The input device instance stores the identifier of the input handler instance upon reception of the successful registration information.

There is a list of handlers stored in the device data structure corresponding to the input device. Specifically, if there is a successful registration, then the identifier of the input handler instance is stored in the list of handlers. If registration fails, then the identifier of the input handler instance will not be stored in the list of handlers. In the case that there is an input action of the input device, then an input event is reported from the corresponding device data structure to the input handler instance whose identifier is stored in the list of handlers.

Each set of device driver information can include but will not be limited to information about types of buses supported by the input device, information of a driver provider of the input device, product information of the input device, information about a driver version of the input device, etc.

Device driver information of input devices in an existing smart terminal is typically undistinguishable. Thus for the purpose of an application of the method according to the embodiment of the invention, device driver information of an input device to be registered with an input handler instance can be modified according to an application demand, so that the modified device driver information is the same as registration match information stored in the input handler instance, or registration match information stored in the input handler instance can be modified so that the device driver information of the input device is the same as the modified registration match information stored in the input handler instance; and device driver information of an input device which is not to be registered with an input handler instance can be modified for the input device, so that the modified device driver information is not the same as registration match information stored in the input handler instance, and the modified device driver information is not the same as any of sets of registration match information stored in the input handler instance.

Specifically, device driver information can be input by a human operator, and a higher layer of an operating system of a smart terminal can perform a corresponding operation of modifying device driver information of a target input device to be the device driver information input by the human operator, alternatively, registration match information stored in an input handler instance is modified to be information input by the human operator.

Alternatively the higher layer of the operating system of the smart terminal can obtain the registration match information in the input handler instance, and modify the device driver information of the target input device to be the same or not the same as the registration match information in the input handler instance in response to an instruction of a user or under a preconfigured policy; or can obtain the device driver information of the target input device, and modify the registration match information stored in the input handler instance to be the same or not the same as the device driver information of the target input device in response to an instruction of a user or under a preconfigured policy.

Taking a smart mobile phone as an example, input devices on the smart mobile phone typically include a touch screen, keys, an earphone, an acceleration sensor, an optical distance sensor, a gyroscope sensor, etc. In the case that the smart mobile phone is in an operating mode, the respective sensors report an input event frequently. However the sensors typically have a low performance requirement, for example, an input event of the acceleration sensor is configured to rotate the screen of the smart mobile phone, and at this time a CPU can operate at a low frequency to satisfy the performance requirement. Thus the input devices of the smart mobile phone can be categorized in two categories, where the first category of input devices relate to a high performance requirement, and the frequency of the CPU needs to be adjusted to the highest level upon the occurrence of an input event, and this category of input devices includes the touch screen, the keys, the earphone, etc.; and the second category of input devices has a low performance requirement, and the frequency of the CPU does not need to be adjusted to the highest level upon the occurrence of an input event, and this category of input devices includes the acceleration sensor, the optical distance sensor, the gyroscope sensor and other various sensors.

Assuming here only an input device with the following device driver information is allowed to be registered with an input handler instance: types of buses supported by the input device are BUS_I2C and BUS_HOST, information about a driver provider of the input device is 0x0001, product information of the input device is 0x0001, and information about a driver version of the input device is 0x0100. Correspondingly, the device driver information is stored in an ID table in the input handler instance.

Drivers of respective input devices are typically provided by the same driver provider, and then device driver information of the respective input device is the same. For the purpose of distinguishing, the device driver information of the input devices is modified before a smart mobile phone is shipped from a factory. Alternatively, the device driver information of the input devices can be modified through a provided development platform after the smart mobile phone is shipped from the factory. Specifically, the device driver information of the foregoing first category of input devices can be modified to be the device driver information allowed to be registered with the input handler instance. The device driver information of the foregoing second category of input devices can be modified to ensure the input devices cannot be registered with the input handler instance.

For example, the device driver information of the touch screen is modified so that the supported type of bus is BUS_I2C, the information about a driver provider is 0x0001, the product information is 0x0001, and the information about a driver version is 0x0100. The device driver information of the keys is modified so that the supported type of bus is BUS_HOST, the information about a driver provider is 0x0001, the product information is 0x0001, and the information about a driver version is 0x0100.

With the foregoing configuration, the frequency of the CPU can be adjusted by defining a new CPU frequency adjusting mode in which the frequency of the CPU is adjusted in the method according to the embodiment of the invention. Alternatively, the On Demand mode can be extended to adjust the frequency of the CPU in the method according to the embodiment of the invention.

Figure 2:
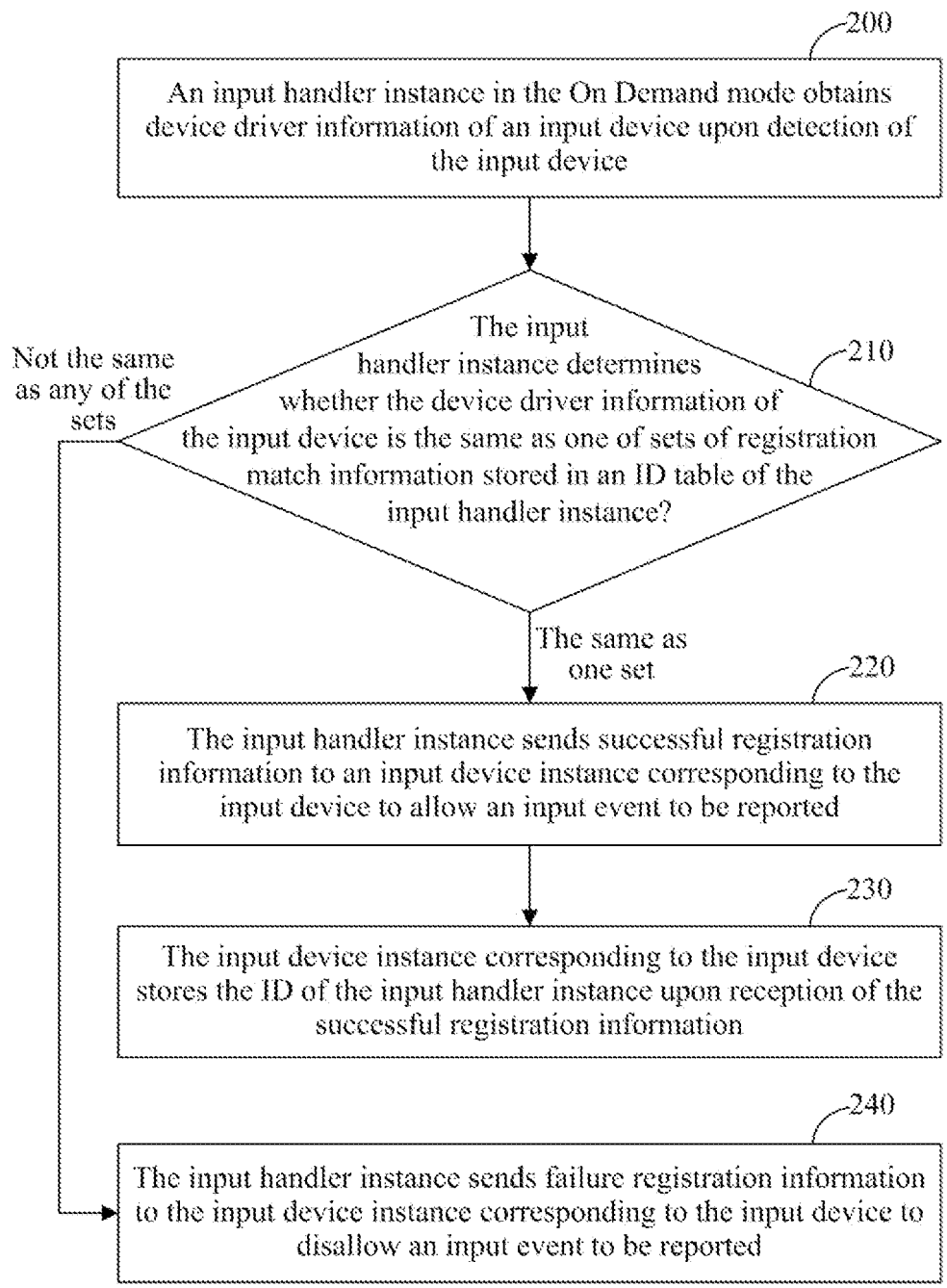
FIG. 2 is a flow chart of a second method for controlling an input device to be registered with an input handler instance according to an embodiment of the invention.

Taking the extended On Demand mode as an example, as illustrated in FIG. 2, when a smart mobile phone is enabled fully, a flow of controlling an input device to be registered with an input handler instance as illustrated in FIG. 2 includes the following steps.

Step 200. An input handler instance in the On Demand mode obtains device driver information of an input device upon detection of the input device.

In this embodiment, the device driver information includes information about types of buses supported by the input device, information of a driver provider of the input device, product information of the input device and information about a driver version of the input device.

Step 210. The input handler instance in the On Demand mode determines whether the device driver information of the input device is the same as one of sets of registration match information stored in an ID table of the input handler instance, and if so, then the flow proceeds to the step 220; and if the device drive information of the input device is not the same as any of the sets of registration match information stored in the ID table of the input handler instance, then the flow proceeds to the step 240.

Step 220. The input handler instance sends successful registration information to an input device instance corresponding to the input device to allow an input event to be reported, and the flow proceeds to the step 230.

Step 230. The input device instance corresponding to the input device stores the ID of the input handler instance upon reception of the successful registration information.

Step 240. The input handler instance sends failure registration information to the input device instance corresponding to the input device to disallow an input event to be reported.

With the foregoing flow, if a touch screen is detected, then it is registered with the input handler instance; and if an acceleration sensor is detected, then it will not be registered with the input handler instance.

In the foregoing registration flow, an input event will only be reported by an input device registered with the input handler instance. The frequency of a CPU is adjusted to the highest level upon detection of the input event reported from the input device. An input event will not be reported from an input device, e.g., a sensor, which is not registered with the input handler instance, and the frequency of the CPU will not be adjusted to the highest level.

With the foregoing processing flow, the performance of the smart mobile phone can be ensured, but also power consumption of the smart mobile phone can be lowered.

It shall be noted that the input devices have been categorized above only by way of an example but without limitation thereto. It can also be determined according to a practical application demand which input devices can be registered with the input handler instance and which cannot be registered with the input handler instance.

Figure 3:
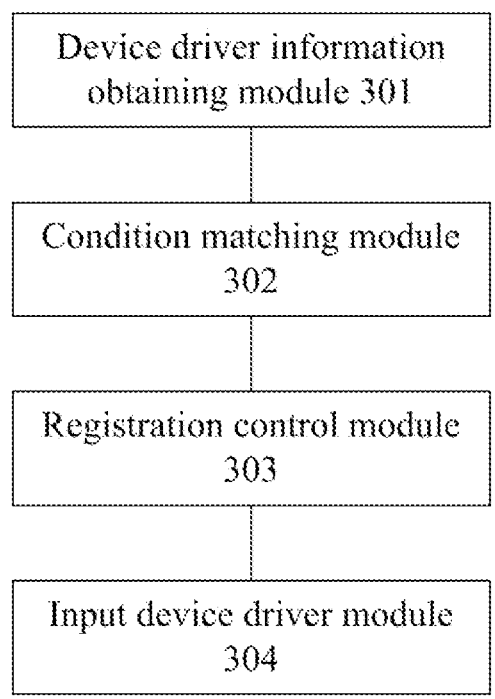
FIG. 3 is a schematic structural diagram of a terminal according to an embodiment of the invention.

Based upon the same inventive idea as the method, an embodiment of the invention further provides a terminal, comprising a processor, as illustrated in FIG. 3, the processor is implemented as follows.

A device driver information obtaining module 301 is configured to obtain device driver information of an input device upon detection of the input device.

A condition matching module 302 is configured to determine whether the device driver information of the input device is the same as one of sets of registration match information stored in an input handler instance corresponding to a CPU frequency adjusting mode.

A registration control module 303 is configured to send successful registration information to an input device instance corresponding to the input device to allow an input event to be reported, in the case that the condition matching module 302 determines that the device driver information of the input device is the same as one of the sets of registration match information stored in the input handler instance; and to send failure registration information to the input device instance corresponding to the input device to disallow an input event to be reported, in the case that the condition matching module determines that the device driver information of the input device is not the same as any of the sets of registration match information stored in the input handler instance.

An input device driver module 304 is configured to store the identifier of the input handler instance upon reception of the successful registration information.

Preferably, if the input device fails to be registered, the processor according to the embodiment of the invention can further include a first information modifying module configured to modify the device driver information of the input device so that the modified device driver information is the same as one of the sets of registration match information stored in the input handler instance; or to modify at least one of the sets of registration match information stored in the input handler instance so that the device driver information is the same as the one of the sets of registration match information stored in the input handler instance.

Preferably, if the input device is registered successfully, the processor according to the embodiment of the invention can further include a second information modifying module configured to modify the device driver information of the input device so that the modified device driver information is not the same as any of the sets of registration match information stored in the input handler instance; or to modify at least one of the sets of registration match information stored in the input handler instance so that the device driver information is not the same as any of the sets of registration match information stored in the input handler instance.

With the foregoing respective embodiments, the device driver information includes at least one of information about types of buses supported by the input device, information of a driver provider of the input device, product information of the input device and information about a driver version of the input device.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for controlling an input device to be registered with an input handler instance, comprising:
   obtaining, by an input handler instance corresponding to a central processing unit frequency adjusting mode, device driver information of an input device upon detection of the input device;
   determining, by the input handler instance, whether the device driver information of the input device is the same as one of sets of registration match infoupation stored in the input handler instance;
   if so, then sending, by the input handler instance, successful registration information to an input device instance corresponding to the input device to allow an input event to be reported;
   if the device drive information of the input device is not the same as any of the sets of registration match information stored in the input handler instance, then sending, by the input handler instance, failure registration information to the input device instance corresponding to the input device to disallow an input event to be reported; and
   storing, by the input device instance corresponding to the input device, an identifier of the input handler instance upon reception of the successful registration information, and reporting an input event to the input handler instance whose identifier is stored in the input device instance when there is an input action of the input device so that the input handler instance adjusts the frequency of the central processing unit after receiving the input event from the input device instance.

2. The method according to claim 1, wherein if the input device fails to be registered, then the method further comprises:
   modifying the device driver information of the input device so that the modified device driver information is the same as one of the sets of registration match information stored in the input handler instance;
   or
   modifying at least one of the sets of registration match information stored in the input handler instance so that the device driver information is the same as the one of the sets of registration match information stored in the input handler instance.

3. The method according to claim 2, wherein the device driver information comprises at least one of:
   information about types of buses supported by the input device, information of a driver provider of the input device, product information of the input device, and information about a driver version of the input device.

4. The method according to claim 1, wherein if the input device is registered successfully, then the method further comprises:
   modifying the device driver information of the input device so that the modified device driver information is not the same as any of the sets of registration match information stored in the input handler instance;
   or
   modifying at least one of the sets of registration match information stored in the input handler instance so that the device driver information is not the same as any of the sets of registration match information stored in the input handler instance.

5. The method according to claim 4, wherein the device driver information comprises at least one of:
   information about types of buses supported by the input device, information of a driver provider of the input device, product information of the input device, and information about a driver version of the input device.

6. The method according to claim 1, wherein the device driver information comprises at least one of:

information about types of buses supported by the input device, information of a driver provider of the input device, product information of the input device, and information about a driver version of the input device.

7. A terminal, comprising: a processor, configured to implement:
a device driver information obtaining module configured to obtain device driver information of an input device upon detection of the input device;
a condition matching module configured to determine whether the device driver information of the input device is the same as one of sets of registration match information stored in an input handler instance corresponding to a central processing unit frequency adjusting mode;
a registration control module configured to send successful registration information to an input device instance corresponding to the input device to allow an input event to be reported in the case that the condition matching module determines that the device driver information of the input device is the same as one of the sets of registration match information stored in the input handler instance; and to send failure registration information to the input device instance corresponding to the input device to disallow an input event to be reported in the case that the condition matching module determines that the device driver information of the input device is not the same as any of the sets of registration match information stored in the input handler instance; and
an input device driver module configured to store an identifier of the input handler instance upon reception of the successful registration information, and report an input event to the input handler instance whose identifier is stored in the input device driver module when there is an input action of the input device so that the input handler instance adjusts the frequency of the central processing unit after receiving the input event from the input device instance.

8. The terminal according to claim 7, the processor is further configured to implement: a first information modifying module configured:
if the input device fails to be registered, to modify the device driver information of the input device so that the modified device driver information is the same as one of the sets of registration match information stored in the input handler instance;
or
to modify at least one of the sets of registration match information stored in the input handler instance so that the device driver information is the same as the one of the sets of registration match information stored in the input handler instance.

9. The terminal according to claim 8, wherein the device driver information comprises at least one of:
information about types of buses supported by the input device, information of a driver provider of the input device, product information of the input device, and information about a driver version of the input device.

10. The terminal according to claim 7, the processor is further configured to implement: a second information modifying module configured:
if the input device is registered successfully, to modify the device driver information of the input device so that the modified device driver information is not the same as any of the sets of registration match information stored in the input handler instance;
or
to modify at least one of the sets of registration match information stored in the input handler instance so that the device driver information is not the same as any of the sets of registration match information stored in the input handler instance.

11. The terminal according to claim 10, wherein the device driver information comprises at least one of:
information about types of buses supported by the input device, information of a driver provider of the input device, product information of the input device, and information about a driver version of the input device.

12. The terminal according to claim 7, wherein the device driver information comprises at least one of:
information about types of buses supported by the input device, information of a driver provider of the input device, product information of the input device, and information about a driver version of the input device.

13. A storage device that stores program code for controlling an input device to be registered with an input handler instance, wherein the program code is executable by a processor to implement:
a device driver information obtaining module configured to obtain device driver information of an input device upon detection of the input device;
a condition matching module configured to determine whether the device driver information of the input device is the same as one of sets of registration match information stored in an input handler instance corresponding to a central processing unit frequency adjusting mode;
a registration control module configured to send successful registration information to an input device instance corresponding to the input device to allow an input event to be reported in the case that the condition matching module determines that the device driver information of the input device is the same as one of the sets of registration match information stored in the input handler instance; and to send failure registration information to the input device instance corresponding to the input device to disallow an input event to be reported in the case that the condition matching module determines that the device driver information of the input device is not the same as any of the sets of registration match information stored in the input handler instance; and
an input device driver module configured to store an identifier of the input handler instance upon reception of the successful registration information, and report an input event to the input handler instance whose identifier is stored in the input device driver module when there is an input action of the input device so that the input handler instance adjusts the frequency of the central processing unit after receiving the input event from the input device instance.

14. The storage device according to claim 13, wherein the program code is further executable by the processor to implement: a first information modifying module configured:
if the input device fails to be registered, to modify the device driver information of the input device so that the modified device driver information is the same as one of the sets of registration match information stored in the input handler instance;
or
to modify at least one of the sets of registration match information stored in the input handler instance so that the device driver information is the same as the one of the sets of registration match information stored in the input handler instance.

15. The storage device according to claim 14, wherein the device driver information comprises at least one of:
information about types of buses supported by the input device, information of a driver provider of the input device, product information of the input device, and information about a driver version of the input device.

16. The storage device according to claim 13, wherein the program code is further executable by the processor to implement: a second information modifying module configured:
if the input device is registered successfully, to modify the device driver information of the input device so that the modified device driver information is not the same as any of the sets of registration match information stored in the input handler instance;
or
to modify at least one of the sets of registration match information stored in the input handler instance so that the device driver information is not the same as any of the sets of registration match information stored in the input handler instance.

17. The storage device according to claim 16, wherein the device driver information comprises at least one of:
information about types of buses supported by the input device, information of a driver provider of the input device, product information of the input device, and information about a driver version of the input device.

18. The storage device according to claim 13, wherein the device driver information comprises at least one of:
information about types of buses supported by the input device, information of a driver provider of the input device, product information of the input device, and information about a driver version of the input device.

* * * * *